United States Patent [19]

Nasrallah et al.

[11] Patent Number: 5,409,124

[45] Date of Patent: Apr. 25, 1995

[54] BEVERAGE CONTAINER WITH BOTTOM CAVITY

[75] Inventors: Maurice Nasrallah, Tarrytown, N.Y.; Fred Sadeghi, Danbury, Conn.

[73] Assignee: Kraft Foods, Inc., Northfield, Ill.

[21] Appl. No.: 173,528

[22] Filed: Dec. 23, 1993

[51] Int. Cl.$^6$ .............................................. B65D 23/00
[52] U.S. Cl. ...................................... 215/1 A; 215/2; 220/710
[58] Field of Search ................ 215/1 A, 2, 253; 220/710, 714

[56] References Cited

U.S. PATENT DOCUMENTS

| | | | |
|---|---|---|---|
| 3,140,571 | 7/1964 | Dörper et al. | 53/39 |
| 3,347,401 | 11/1967 | Nataf | 215/1 |
| 3,486,679 | 12/1969 | Pfahler | 215/1 A X |
| 3,765,144 | 10/1973 | Schiesser | 53/477 X |
| 3,825,408 | 7/1974 | Farfaglia et al. | 432/230 |
| 3,980,515 | 9/1976 | Reil et al. | 156/497 |
| 3,997,385 | 12/1976 | Osborne | 156/272 |
| 4,019,946 | 4/1977 | Greisman | 156/497 |
| 4,350,003 | 9/1982 | Greenawalt | 53/548 |
| 4,394,204 | 7/1983 | Hutcheson | 156/275.1 |
| 4,511,426 | 4/1985 | Linner | 53/477 X |
| 4,957,581 | 9/1990 | Jährig et al. | 53/477 X |
| 4,982,854 | 1/1991 | Ichimiya | 222/572 X |
| 5,078,286 | 1/1992 | Hashimoto | 215/1 A |
| 5,280,844 | 1/1994 | Kaufman et al. | 220/710 |
| 5,295,609 | 3/1994 | Robbins, III | 215/1 A X |

Primary Examiner—Allan N. Shoap
Assistant Examiner—Christopher McDonald
Attorney, Agent, or Firm—Thomas R. Savoie; Thomas A. Marcoux

[57] ABSTRACT

A unitary beverage container includes a main body defining a container volume in which a beverage is contained. A top of the main body includes a channel disposed horizontally therealong as well as an uppermost bisecting ridge extending from one side of the main body to the other and a respective remainder portion on each side of the ridge sloping downwardly away from the ridge. A bottom of the main body has a lowermost continuous base surface and a central concavity extending inwardly therefrom. The central concavity is particularly formed by a horizontal recess surface and a peripheral recess band sloped radially inward. A flexible straw has a proximal end fluidly connected with the container volume and a distal end having an aperture therein which is located in the channel of the top. A holding mechanism removably holds the distal end of the flexible straw in the channel. In order to fill the beverage container, the bottom includes a filling conduit extending from the central concavity. This filling conduit is heated on the interior only at a location in the central concavity, and then pinched off and closed horizontally in the central concavity after filling to seal the container.

9 Claims, 3 Drawing Sheets

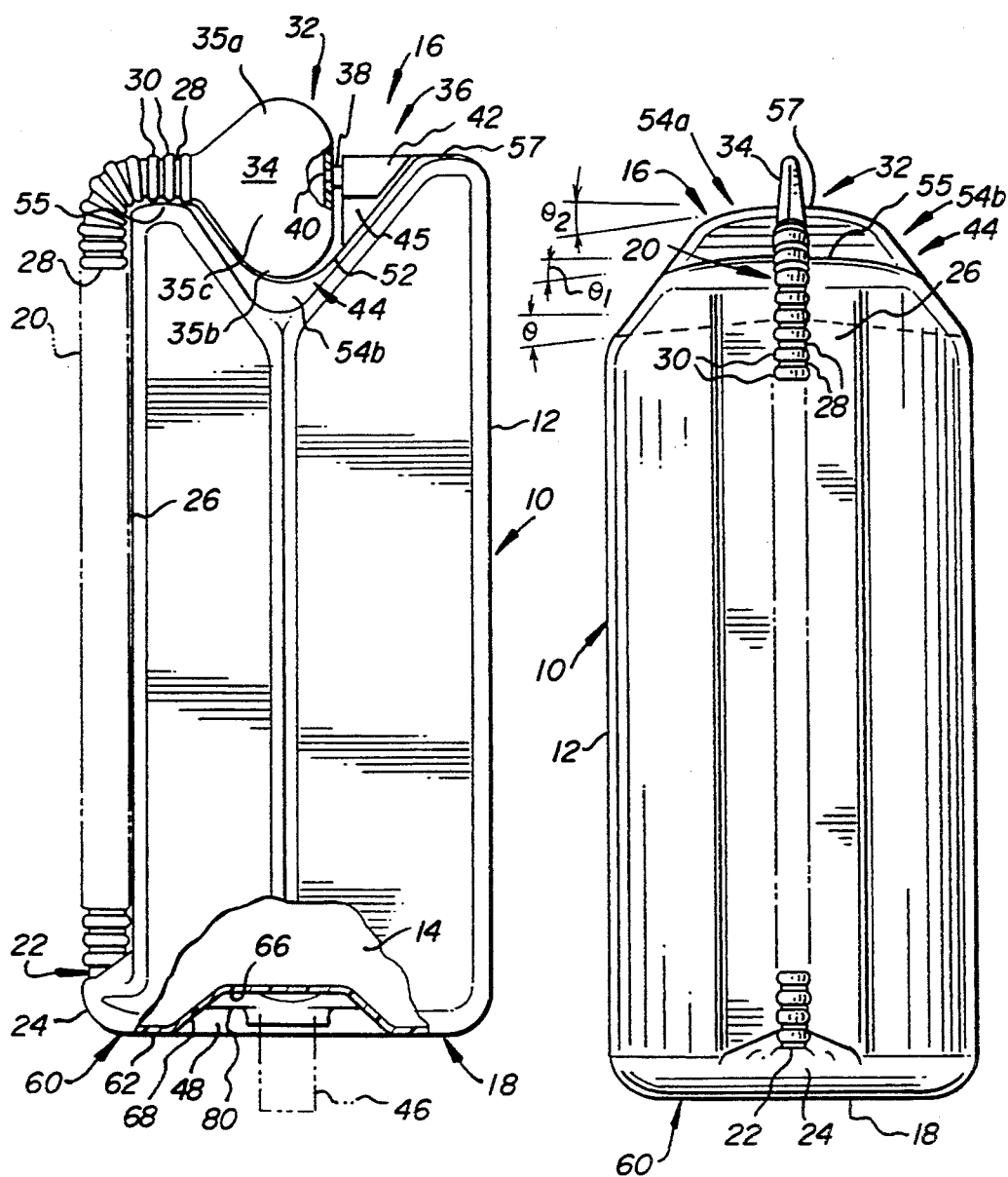

BEVERAGE CONTAINER WITH BOTTOM CAVITY

FIELD OF THE INVENTION

The present invention relates generally to beverage containers, and more particularly to a one-piece or unitary beverage container with an integral straw (such as disclosed in U.S. patent Ser. No. 5,385,264, which is hereby incorporated by reference) which is easily molded and which includes a bottom concavity which is particularly designed and used in the filling and subsequent sealing of the beverage container.

BACKGROUND OF THE INVENTION

Many different beverages are provided in various containers. Of particular use by small children are small beverage containers which are accessed by a straw. Typically, the straw is removably attached to the outside of the container and is separately wrapped. Thus, the straw can be lost, making the beverage hard to consume. In addition, the loose straw and wrapper for the straw are potential problems with small children who might accidentally try to swallow them. These loose items are also a trash nuisance as they tend to be dropped. Further, many of these small beverage containers are made from multi-ply laminates which include paper, foil and plastic and are therefore not easily recyclable.

A beverage container made of a synthetic resin and having a sipping tube or straw connected to the container bottom is disclosed in U.S. Pat. No. 4,982,854 (Ichimiya). A middle portion of the sipping tube is provided with a flexional bellows and the sipping tube is fitted into a longitudinal groove formed on the container body. Filling is accomplished by an inlet provided in a concave portion of the bottom with supporting feet on either side. This inlet is subsequently covered by an adhesive film.

Another plastic beverage container including an attached straw is disclosed in U.S. Pat. No. 5,078,286 (Hashimoto). With this beverage container, a filling tube is disclosed which extends from a bottom of the container. After filling, this filling tube may be crimped, sealed or otherwise closed off and excess filling tube material removed. The remaining filling tube may then be inverted into the container body in order to provide a bottom surface which is free from projections.

A container with an embedded filling and drinking pipe is disclosed in U.S. Pat. No. 3,347,401 (Nataf). This pipe is provided between two recesses dividing the container into two halves and connected at the bottom. Exhaust pipes are also provided at the top of each half which are closed after filling.

Other patents have also disclosed various integral sipping tubes or straws and filling conduits. Among these are the following U.S. patents: U.S. Pat. Nos. 3,765,144 (Schiesser), 4,607,755 (Andreozzi), 4,573,631 (Reeves), 4,830,204 (Lin), and 5,054,631 (Robbins, III). Other containers of general interest including various straw mounting means are shown in the following U.S. patents: U.S. Pat. Nos. 5,005,717 (Oilar), 3,332,567 (Pugh, Sr.), 4,669,608 (Thompson), and 4,712,702 (Ayabe et al.).

Of general interest concerning the sealing of containers using heat are the following U.S. patents: U.S. Pat. Nos. 4,957,581 (Jahrig et al.), 4,511,426 (Linner), 4,394,204 (Hutcheson), 4,350,003 (Greenawait et al.), 4,019,946 (Greisman), 3,997,385 (Osborne), 3,980,515 (Reil et al.), 3,825,408 (Farfaglia), 3,765,144 (Schiesser), and 3,140,571 (Dorper et al.).

SUMMARY OF THE INVENTION

In accordance with the present invention, a unitary beverage container is provided which includes a main body defining a container volume in which a beverage is contained. A top of the main body preferably includes a channel disposed horizontally therealong. In addition, the top also includes an uppermost ridge extending from one side of the main body to the other and a respective remainder portion on each side of the ridge sloping downwardly away from the ridge. A bottom of the main body has a lowermost, continuous base surface and a central concavity extending inwardly therefrom. The concavity is defined by an essentially horizontal recess surface and a peripheral recess band extending between the continuous base surface and the recess surface. In order to consume the beverage in the main body, a flexible straw is provided which has a proximal end fluidly connected with the container volume of the main body and a distal end having an aperture therein which may be located in a channel of the top of the main body. A holding means removably holds the distal end of the flexible straw to the top of the main body.

In accordance with a preferred embodiment, the channel is vertically shallow and extends vertically less than 25% of a height of the main body. In addition, the ridge substantially bisects the top and is formed at the mating plane of two molds used to blow mold the main body.

In order to fill the beverage container, the bottom includes a filling conduit extending from the recess surface of the central concavity. This filling conduit is pinched off and closed so as to be horizontally within (not extending out of) the central concavity after filling.

In the preferred embodiment, the main body is vertically elongated and the holding means includes an attaching means for removably attaching the distal end of the straw to the channel. In addition, the remainder portions extend downwards from the ridge at an angle of about 5°–10° from horizontal. The flexible straw preferably includes a plurality of inner and outer segments with the outer segments being outwardly and centrally shaped. The proximal end of the straw is also preferably connected with the container volume adjacent the bottom of the main body.

Also in accordance with the preferred embodiment, the recess surface is circular and a horizontal area of the concavity is at least ½ of a horizontal area of the base surface. In addition, the peripheral band is sloped radially inwardly from the base surface to the recess surface, and a horizontal distance of the peripheral band is greater than a distance from the base surface to the recess surface. Preferably, the bottom also has a horizontal width and length dimension which are about equal, and the filling conduit has an outside diameter which is about 0.5 inches (1.27 cm) or more and preferably is at least 20% of the horizontal width and length dimensions of the bottom.

The present invention also includes a method of forming a beverage container including an initial step of blow molding a unitary beverage container as discussed above. The beverage container, when oriented with the filling conduit uppermost and extending vertically, is filled with a beverage introduced through the filling conduit. Next, two complementary pinching jaws are located on respective opposite vertical sides of the filling conduit and in the central concavity, with the pinching jaws each including a cutting member located vertically below the base surface. Only an interior area of the filling conduit adjacent the pinching jaws is then heated to a melting temperature. Finally, the pinching jaws are closed to pinch the filling conduit closed in the central concavity so that the interior area is fused together and to cut off an upper portion of the filling conduit thereabove with the cutting members.

Preferably with this forming method, the heating step includes the step of introducing a nozzle with an outlet into the filling conduit until the outlet is directed to heat the interior area of the filling conduit adjacent the pinching jaws. Then, the heating step includes the subsequent step of discharging heated air through the outlet to heat only the interior area of the filling conduit to the melting temperature. The discharged air is typically at about 550° to 850° F.

It is an object of the present invention to provide a one-piece beverage container which is easy to make, fill, and use.

It is also an object of the present invention to provide a one-piece beverage container which stands up readily, which is relatively stable to tipping and which is easy to package together with other such beverage containers after filling.

It is a further object of the present invention to provide a beverage bottle and associated parts which are strong and which will not easily develop leaks after filling.

Other features and advantages of the present invention are stated in or apparent from a detailed description of presently preferred embodiments of the invention found hereinbelow.

BRIEF DESCRIPTION OF THE DRAWINGS

FIG. 3 is an elevation view of the filled beverage container depicted in FIG. 1 which has been rotated 45° clockwise.

FIG. 4 is an elevation view of the beverage container depicted in FIG. 1 which has been rotated 135° clockwise, and showing a cutaway of a filling conduit after filling as well as in phantom prior to filling.

DETAILED DESCRIPTION OF THE PREFERRED EMBODIMENTS

Figure 1:
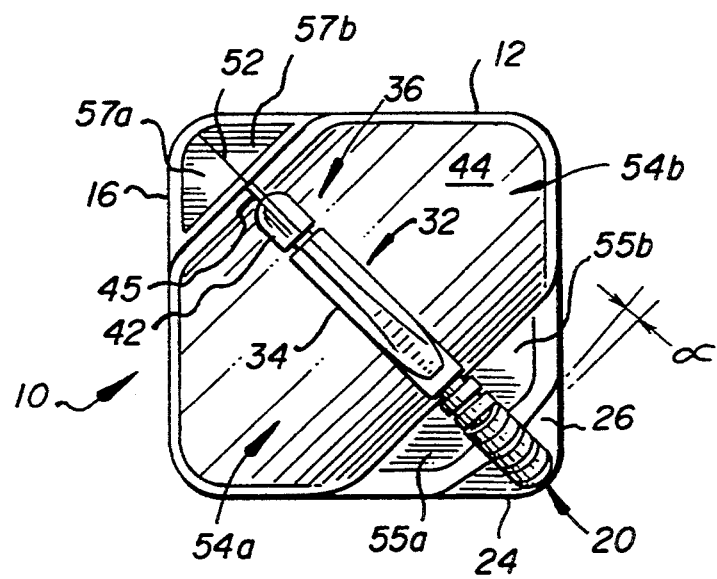
FIG. 1 is a top plan view of a filled beverage container according to the present invention.

With reference now to the drawings in which like numerals represent like elements throughout the views, a beverage container 10 is depicted in FIGS. 1-4. Beverage container 10 is designed to be easily and simply blow molded from a synthetic resin or plastic such as low density or preferably high density polyethylene, as a unitary or one-piece container formed in a single operation as explained subsequently. However, it will be appreciated at this time that it is a feature of beverage container 10 that no horizontal surfaces are present, other than that in the bottom so that beverage container 10 can be easily made for a subsequent easy filling and closing off after filling. Surfaces appearing to be horizontal are in fact slightly inclined to horizontal as discussed subsequently.

Beverage container 10 includes a vertically elongated main body 12 (about 5.8″ overall length) which is rectangularly shaped (about 2″×2″) with rounded corners in plan view and which defines a container volume 14 in which a beverage is contained. Typically, such beverages are fruit juices, flavored drinks or the like. With such beverages, the material of beverage container 10 is usually translucent so that the liquid level can be seen, and the material may be colored the same or similar to the color of the beverage contained. In addition, suitable indicia or the like can be provided on the walls of main body 12 as part of the blow molding process if desired. Main body 12 has a top 16 and a bottom 18 particularly shaped as described subsequently.

In order to access the beverage in volume 14 of main body 12, an integral sipping tube or straw 20 is provided which is formed to be easily bendable. It will be appreciated that straw 20 is easily formed of alternating inner and outer segments 28 and 30, respectively. While inner segments 28 are generally cylindrical, outer segments 30 are designed to extend outwardly and to peak centrally relative to the adjacent inner segments 28 (and thus do not have horizontal surfaces). As depicted, outer segments 30 are semicircular shaped in profile, but outer segments 30 could also be V-shaped or some other shape with the required reduced profile extending away from inner segments 28 to allow easy separation from the mold halves after forming.

Straw 20 includes a proximal end 22 which is integrally formed at a bottom corner 24 of main body 12. As shown, straw 20 extends upwardly along a bevel surface 26 of main body 12 provided above corner 24 and between the two adjacent sides. Bevel surface 26 is inclined inwardly at an angle $a$ to make it easier for the mold halves forming main body 12 to separate. Corner 24 at the intersection with straw 20 slopes upwardly toward bevel surface 26, and does not form a horizontal surface. As will be appreciated from FIG. 1, bevel surface 26 is sized so that straw 20 stays inside of the silhouette of main body 12 when viewed from the bottom.

It will be appreciated that straw 20 is removably attached to bevel surface 26 by very thin connecting pieces (not shown) forming an essentially continuous strip between the outer portions of straw 20 and bevel surface 26. Preferably, these connecting pieces of the strip are simply formed in the blow molding process and are so thin as to be easily broken by the user when it is desired to detach all but proximal end 22 of straw 20 from main body 12.

Straw 20 also includes a distal end 32 which is shaped into a mouthpiece 34. Mouthpiece 34 is preferably hollow and planar shaped as shown, and is comprised of an upper wing 35a, a lower wing 35b, and a remaining (central) portion 35c. This configuration is designed to be easily retained in the mouth of a user, particularly young children.

It will also be appreciated that mouthpiece 34 is provided with wings 35a and 35b so that wings 35a and 35b can serve as a lever or twisting handle. By use of such a lever, distal end 32 is easily detached from a holding means which holds distal end 32 in place, such as an attaching means 36 by which distal end 32 is attached to top 16 of main body 12. While distal end 32 has been depicted in a preferred shape, distal end 32 could be provided in a variety of shapes consistent with its use as a lever. Distal end 32 could also be made smaller so long as distal end 32 is provided with sufficient structure to serve as a lever, and particularly the necessary finger gripping surface area for a thumb and forefinger.

Mouthpiece 34 with wings 35a and 35b is depicted as hollow and planar in a vertical plane, which is easy to provide as mouthpiece 34 (and the remainder of beverage container 10) is blow molded. This hollowness is preferred as such a configuration is comfortable in the mouth. In addition, by making mouthpiece 34 hollow, this hollowness and overall planar shape also contribute to the stiffness of mouthpiece 34 necessary for wings 35a and 35b of mouthpiece 34 to serve as a lever portion thereof. Further, the existence of the hollow volume acts a small reservoir to prevent a small spill from distal end 32 in the event beverage container 10 is knocked over.

Attaching means 36 is essentially a short hollow bridge 38 extending from an aperture 40 provided in mouthpiece 34 to a connecting air chamber piece 42. It will be appreciated that hollow bridge 38 may be formed in a shape and thickness which is easily broken by twisting of mouthpiece 34.

The size of aperture 40 is not critical with respect to the sucking of the beverage from main body 12, although it obviously must be sufficient for ready passage of a sufficient amount of the beverage when mouthpiece 34 is sucked on. However, the size of aperture 40 is important insofar as the larger the size, the greater the force which will be required to sever hollow bridge 38. Thus, a compromise is necessary for these competing objectives, and in beverage container 10 aperture 40 preferably has a major diameter of about 1.5 to 5 mm.

Connecting air chamber piece 42 of attaching means 36 is comprised of a hollow chamber securely attached to a channel 44 provided in top 16 of main body 12 by a solid connection in the form of a connecting wall 45. Connecting piece 42 must be hollow in order to form aperture 40 in mouthpiece 34 during the blow molding process as beverage container 10 is formed, as particularly explained in the above-mentioned incorporated application.

As best shown in FIGS. 1 and 3, channel 44 is provided in top 16 of main body 12 and extends generally horizontally along the entire distance of top 16. Channel 44 is vertically shallow, extending vertically less than 25% and preferably about 15% of the overall height of main body 12. It will also be appreciated that top 16 does not include a horizontal surface (or horizontal components of the curved surface of channel 44). Instead, top 16 includes a central ridge 52 extending from one side of main body 12 to the other (at the corners thereof) which bisects top 16 (along the joining plane of the two mold halves used to form main body 12). Ridge 52 is the uppermost part of top 16, so that there are respective sloping surfaces 54a and 54b, 55a and 55b, and 57a and 57b of top 16 on respective sides of ridge 52. Surfaces 54a and 54b extend downwardly from ridge 52 at an angle $\phi$. Surfaces 55a and 57a and 57b extend downwardly from ridge 52 at an angle $\phi_1$, and $\phi_2$, respectively. Angles $\phi_1$, $\phi_2$ and $\phi$ have a value of about 3°–15° and preferably about 5°–10° and most preferably about 5°. The shape of channel 44 matches the profile of wing 35b of mouthpiece 34 to allow for easy access and separation of the mold halves.

It should be appreciated that top 16 of main body 12 is reduced in height at a peak 55 adjacent to straw 20, so that the height of top 16 at this position and the height of straw 20 (together with the minimal height of the thin connecting pieces) together equal the height of a peak 57 at the opposite corner of top 16. Thus, straw 20 is also contained in the profile of top 16 as shown in FIG. 3.

As mentioned above, mouthpiece 34 is easily detached from connection piece 42 by breaking bridge 38. This is easily done by twisting mouthpiece 34 about its longitudinal axis (which is shared with the adjacent portion of straw 20), typically by placing a thumb on one side of wing 35a and a forefinger on an opposite side of wing 35b. Twisting by applying opposite forces to wings 35a and 35b causes bridge 38 to nonelasticly deform and break so that mouthpiece 34 can be lifted out of concavity 44. At the same time that mouthpiece 34 is lifted, adjacent thin connecting pieces are easily severed. The shape, size and orientation of the wings (or other lever portion), as well as the number of wings may be varied.

In order to fill beverage container 10, beverage container 10 is provided with a bottom 18 which is also specially configured. In particular, bottom 18 includes a continuous outer base surface 60 which is slightly rounded to provide a continuous support ring (area) 62 on which beverage container 10 stands upright easily in normal use. Bottom 18 is also initially provided with a filling tube or conduit 46 which extends longitudinally from a shallow central concavity 48 provided in bottom 18 of main body 12 as shown in the cutaway portion of FIG. 4 and in greater detail in FIGS. 5–9. Filling conduit 46 is cylindrically shaped when formed in the blow molding process and is then made open-ended by cutting the end off to form a filling opening 64. In the filling and sealing operation as depicted in FIGS. 5–9 and discussed subsequently, it will be appreciated that beverage container 10 is reversed (upside down) from the use orientation shown in FIGS. 1–4 to that shown in FIGS. 5–9 so that the beverage is easily introduced through filling conduit 46 and retained in volume 14 by gravity.

Central concavity 48 in bottom 18 is formed by a horizontal recess surface 66 which is circular as shown and a peripheral recess band 68 which connects recess surface 66 and base surface 60. It will be appreciated that in order to provide for a minimum filling time, filling conduit 46 is relatively large and is preferably at least about 20% of the horizontal dimension of bottom 18. In this embodiment, filling conduit 46 has about a 0.5" outside diameter while the horizontal dimension of bottom 18 is 2". Due to this large size, the horizontal area of central concavity 48 must also be relatively large to accommodate the sealing process discussed subsequently, and in particular is at least $\frac{1}{2}$ of a horizontal area of base surface 60. In this embodiment, the horizontal area of central concavity 48 (the horizontal area inside of the intersection of base surface 60 and recess band 68) is about 1.5 square inches while the area of base surface 60 (outside of the intersection) is about 2.5 square inches.

As noted above, in order to make the separation of the blow mold halves easier, no horizontal surfaces are present, except in bottom 18. There, the only substantially horizontal surface is recess surface 66. The problem which would arise during separation of the blow mold halves would then be the presence of a vertical recess band. However, by sloping recess band 68 sufficiently outwardly from recess surface 66, separation is not adversely affected but is instead actually enhanced.

In particular, by sloping recess band 68, in conjunction with the absence of any other horizontal surfaces on the remainder of main body 12, the horizontal separation of the mold halves results in the mold halves each pushing horizontally (and oppositely) only against sloping recess band 68. This causes a small upward force (in the orientation depicted in FIGS. 1-2) to be exerted on all of main body 12. This small upwards force thus actually helps to separate the mold halves from the remainder of main body 12, as portions of the hot plastic making up main body 12 would otherwise tend to stick to one or the other of the mold halves. This upwards force and subsequent movement of main body 12 is not prevented or retarded due to the absence of any other horizontal surfaces, as with just a little separation there is thus room in the horizontally separating mold halves for a slight upward movement of main body 12, particularly at surfaces 54a and 54b, 55a and 55b, and 57a and 57b.

In order to best accommodate for this upward force and movement in conjunction with a relatively soft plastic material of main body 12, the horizontal distance of recess band 68 is made greater than the vertical distance from base surface 60 to recess surface 66. However, the depth of central concavity is preferably not great. Thus, in this preferred embodiment, the horizontal distance of recess band 68 is about 0.37" while the vertical distance from base surface 60 to recess surface 66 (i.e., the vertical distance of recess band 68) is about 0.25".

Figure 5:
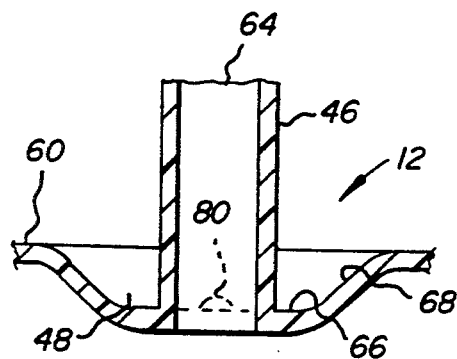
FIGS. 5-9 are schematic cross-sectional elevation views of an inverted bottom of the filled beverage container depicted in FIG. 1 showing different steps in closing off of the filling conduit of the bottom.

After filling, with main body 12 oriented as shown in FIG. 5 with filling conduit 46 extending upwardly, filling conduit 46 is heat sealed or crimped closed according to the following process depicted schematically in FIGS. 5-9. The orientation of main body 12 shown in FIG. 5 is achieved either by molding main body 12 in this orientation, or by molding in the orientation depicted in FIGS. 3-4 and subsequently flipping main body 12. In either event, main body 12 is suitably conveyed and then located in a puck or other holder of the conveyor (used during the filling operation) which is transferred to a suitable sealing station such as provided with turret device.

Figure 6:
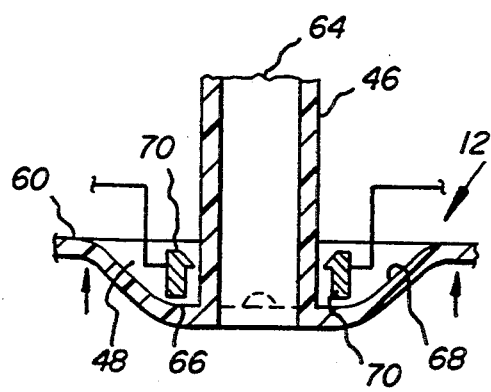

At the turret device, main body 12 is initially raised as shown by the arrows of FIG. 6 to a position where a set of complementary cold pinching jaws 70 are located on opposite sides of filling conduit 46. It will be appreciated that jaws 70 are positioned to just approach or touch recess surface 66, so that jaws 70 are as low as possible. It will also be appreciated that jaws 70 should have a joining plane which will coincide with the joining plane of the mold halves.

Figure 7:
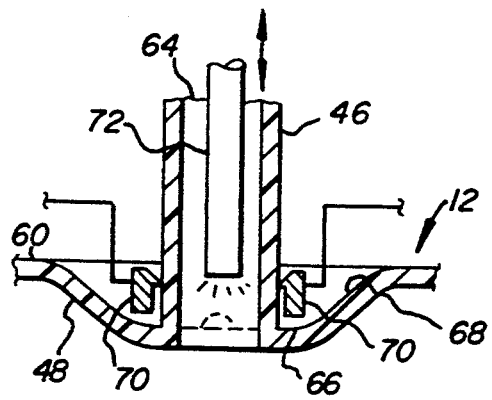

At the next station depicted in FIG. 7, a nozzle 72 is introduced into filling conduit 46 to a position at or slightly above that of jaws 70. Heated air is then discharged through the outlet of nozzle 72 to heat the interior area only of filling conduit 46 adjacent to jaws 70 to the melting temperature thereof. For the plastic of main body 12, this is done with air heated to about 700° F.±150° F. for about 1.5±0.5 seconds. After this heating, nozzle 72 is withdrawn. While other types of heating of the interior of filling conduit 46 are possible, such as with radiant, infrared or a conduction element, air flow has been found to be more uniform and easier to control. Thus, it is possible to heat the interior of filling conduit so that only the interior is melted, and in particular so that the adjacent exterior surface is not melted.

Figure 8:
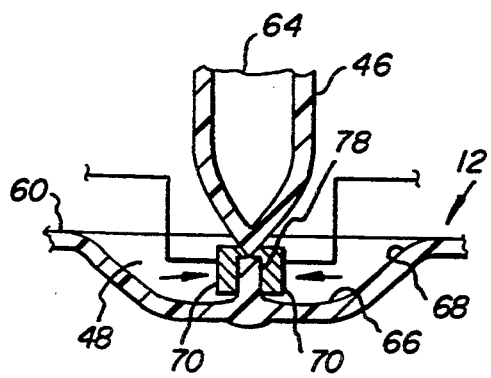
Figure 10:
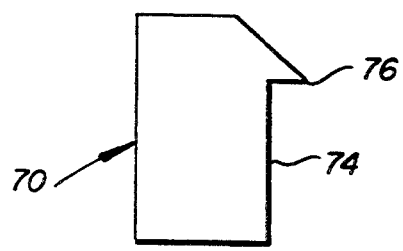
FIG. 10 is a side elevation view of the jaws depicted in FIGS. 6-8 showing greater detail thereof.

At the next station as depicted in FIG. 8, jaws 70 are pushed toward one another, pinching the adjacent portion of filling conduit 46 therebetween. As will be appreciated from the depiction of jaw 70 in FIG. 10, jaws 70 include a pressing portion 74 which presses the adjacent portions of filling conduit 46 together to form a seal 78 and a cutting edge 76 thereabove which cuts filling conduit 46 thereat. Thus, after the interior of filling conduit 46 is made molten, the pinching action of jaws 70 at pressing portion 74 causes the interior melted portions to fuse or weld together at seal 78 to completely seal filling conduit 46. At the same time, cutting edges 76 sever the remaining portion of filling conduit 46 from seal 78.

It will be appreciated that jaws 70 are not heated, and that only the interior of filling conduit 46 is heated by the hot air to a melting temperature. Thus, when jaws 70 pinch filling conduit 46, the jaws only contact the non-melted (but softened) exterior of seal 78 of filling conduit 46 so that there is no tendency of jaws 70 to stick to filling conduit 46 as there would be if the exterior of filling conduit 46 were melted or if jaws 70 were heated (to provide melting of filling conduit 46).

Figure 9:
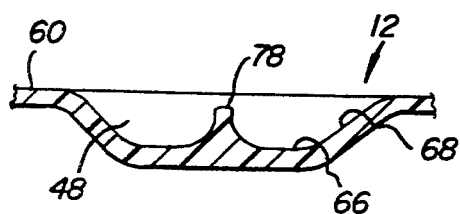

After removal of jaws 70, bottom 18 of main body 12 is as depicted in FIG. 9. It will be appreciated that cutting edges 76 of jaws 70 are particularly located during the cutting action to be inside of central cavity 48. Thus, filling conduit 46 is cut off inside of central cavity and no portion of seal 78 of filling conduit 46 extends beyond base surface 60. If seal 78 of filling conduit 46 extended beyond base surface 60, base surface 60 would not be the sole lowermost portion of main body 12 forming a stable surface for main body 12 to rest on. Additionally, impacts to any portion of seal 78 of filling conduit 46 extending beyond base surface 60 would be inevitable and might result in stresses which would cause a leak at seal 78.

Figure 2:
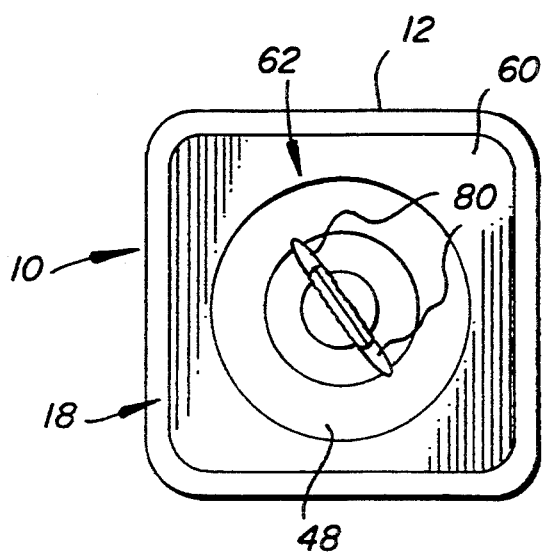
FIG. 2 is a bottom plan view of the filled beverage container depicted in FIG. 1.

It will also be appreciated that the area adjacent to seal 78 is somewhat thickened at some places and stretched at others due to the pinching action of jaws 70, which causes some minor flow of the melted or softened portion thereof. To assure that this flow, particularly any stretching, does not result in any unsealed or broken (as by stretching) portions of recess surface 66, recess surface 66 is also provided with buildups 80 along the pinching plane (and molding plane) adjacent filling conduit 46 as best shown in FIG. 2. By providing this built up area, any stretching which may occur there is easily accommodated by the extra material (thickness) there so that such stretching will not create a leak.

It will further be appreciated that the above-described filling and closing off of filling conduit 46 of beverage container 10 is significantly simpler than the equivalent process disclosed for the beverage container in the incorporated application (and in the Hashimoto patent), so that the present invention is an improvement over this device. In this previous device, a filling conduit extends beyond the bottom after closing which is then inverted (as by slamming) inside of the bottom. It is thus an object of the present invention to avoid this inverting operation, which is both time consuming as well as a potential source of leakage for the container. In addition, the inversion of such a filling conduit also limited the size of the filling conduit, thus also limiting filling speed and increasing capital.

The present invention avoids the problem of inversion and filling conduit size by the direct crimping of filling conduit 46 inside of the provided central concavity 48. However, while it would seem easy to provide such a filling conduit and central concavity in the similar container disclosed in the incorporated application, the manufacture of a main body of this type using a reciprocating screw-type blow molding system was not possible until the other modifications were made to the main body as discussed generally above and with reference to the prior art device below for additional clarity.

Thus, it will initially be appreciated that both the previous container and beverage container 10 of the present invention are made by blow molding with two mold halves which come together horizontally along a plane which vertically bisects the container. Due to the presence of central concavity 48 after forming with the mold halves, it is not possible to simply provide such a concavity in the previous device as the separation of the mold halves causes horizontal engagement of the mold halves with the sloped peripheral recess band 68 of central cavity 48. This engagement causes tearing and pulling of the low density plastic material and deformation of the container (and the use of high density plastic could not even be considered).

To avoid this engagement problem, while still providing a simple horizontal movement of the mold halves, beverage container 10 of the present invention is specifically designed with no horizontal surfaces other than in central concavity 48 as discussed above. Thus, although initially after molding as the mold halves are moved apart the mold halves do engage the sloped recess band 68 of central cavity 48, there is no other (countering) engagement of the mold halves with main body 12 (as along a horizontal surface at top 16). Consequently there is nothing to prevent main body 12 itself from moving vertically out of the way of the separating mold halves.

In particular, as the mold halves move apart horizontally, the engagement of the mold halves with the sloped recess band 68 of central cavity 48 immediately drives main body 12 upward about ¼" (the height of central cavity 48) as depicted in FIGS. 3 and 4. (Actually, it will be appreciated that main body 12 would usually be molded upside down to the depicted orientation, so in practice main body 12 would be driven and fall or move downward between the mold halves.) This is permitted as there are no horizontal surfaces present in main body 12 (other than in central cavity 48, which surface is driven away from the mold halves together with the sloped walls), so that the horizontal movement of the mold halves thus quickly provides a vertical clearance of ¼" (or whatever height of central cavity 48 is needed) at all surfaces of main body 12 for continued horizontal movement of the mold halves. Main body 12 is thus driven or moved away from the engagement of the sloped recess band 68 of central cavity 48 with the mold halves toward this clearance space without tearing and pulling of the polyethylene, material and the resultant deformation. And as a result of the lack of any significant pulling or deformation forces exerted by the mold halves on main body 12, main body 12 of the present invention can be made from a high density polyethylene resin if desired.

In use, it will be initially appreciated that beverage container 10 is filled and sold to the consumer or user with a protective wrapping material (shrink wrap, plastic overlay, or the like) thereabout as well known by those of ordinary skill in the art. If desired, a number of beverage containers 10, such as six, can be bound together as a pack by the wrapping material. A cardboard sleeve may be positioned around such a pack inside of the wrapping material.

After removal from the wrapping material, the user simply twists mouthpiece 34. This is easily done due to the combined features of the flat shape of mouthpiece 34 with wings 35a and 35b, the concavity 44 provided, and the fact that wing 35a of mouthpiece 34 extends beyond straw 20. This twisting of mouthpiece 34 easily causes bridge 38 to break or shear apart. When this occurs, aperture 40 of mouthpiece 34 is exposed, and mouthpiece 34 can be lifted from concavity 44. As mouthpiece 34 is lifted from concavity 44, the connecting portions attaching the adjacent segments of straw 20 to top 16 are also easily broken or severed. Similarly, by continued pulling on straw 20, the remaining connecting portions along bevel surface 26 are severed so that straw 20 can be moved by the user to any convenient position. In this position, the user simply sucks on mouthpiece 34 to drink the beverage in volume 14 of main body 12.

It should be appreciated that mouthpiece 34 is easily retained in the mouth of the user due to its flat shape, which is especially advantageous for young children. In addition, by making straw 20 flexible, the user can play with the straw which is also an attraction for young children. Further, it should be appreciated that there are no loose parts of beverage container 10 which could become lost or accidentally ingested or swallowed.

While the present invention has been described with respect to an exemplary embodiment thereof, it will be understood by those of ordinary skill in the art that variations and modifications can be effected within the scope and spirit of the invention.

What is claimed is:

1. A unitary, blow-molded, high-density polyethylene beverage container comprising:
    a main body which is vertically elongated defining a container volume in which a beverage is contained;
    a top of said main body, said top including an uppermost ridge bisecting said top and respective surfaces on each side of said ridge sloping downwardly away from said ridge;
    a bottom of said main body having (a) a continuous base surface, (b) a central concavity extending inwardly from said base surface defined by a horizontal recess surface and a peripheral recess band extending between said base surface and said recess surface, and (c) a filling conduit extending from said recess surface which is pinched off and closed horizontally in said central concavity, said horizontal recess surface being the only horizontal surface present in said beverage container, wherein said container does not contain an inverted filling conduit;
    a flexible straw having a proximal end which is fluidly connected with the container volume of said main body and a distal end having an aperture therein; and
    an attaching means for removably attaching said distal end of said flexible straw to said top of said main body and for closing said aperture of said distal end of said flexible straw.

2. A unitary beverage container as claimed in claim 1 wherein said respective surfaces extend downwards from said ridge at an angle of about 5°–10° from horizontal.

3. A unitary beverage container as claimed in claim 2 wherein said recess surface is circular.

4. A unitary beverage container as claimed in claim 1 wherein a horizontal area of said concavity is at least ½ of a horizontal area of said base surface.

5. A unitary beverage container as claimed in claim 1 wherein said peripheral recess band is sloped radially inwardly from said base surface to said recess surface, and wherein the horizontal distance of said peripheral band is greater than the vertical distance from said base surface to said recess surface.

6. A unitary beverage container as claimed in claim 1 wherein said bottom has a horizontal width and length dimension which are equal, wherein said filling conduit has an outside diameter which is at least 20% of the horizontal dimension of said bottom.

7. A unitary beverage container as claimed in claim 1 wherein the horizontal recess surface is provided with buildups along a pinching and molding plan and adjacent said filling conduit.

8. A unitary beverage container as claimed in claim 1 wherein the top of said main body includes a vertically shallow channel disposed horizontally therealong.

9. A unitary beverage container as claimed in claim 8 wherein the vertically shallow channel extends vertically less that 25% of the height of said main body.

* * * * *

UNITED STATES PATENT AND TRADEMARK OFFICE
CERTIFICATE OF CORRECTION

PATENT NO. : 5,409,124
DATED : April 25, 1995
INVENTOR(S) : Maurice Nasrallah, et al.

It is certified that error appears in the above-indentified patent and that said Letters Patent is hereby corrected as shown below:

ON TITLE PAGE ITEM [75],

Inventors: James J. Wang should be added as third inventor as follows:

Maurice Nasrallah, Tarrytown, N.Y.;
Fred Sadeghi, Danbury, Conn.;
James J. Wang, New City, N.Y.

Signed and Sealed this

Twenty-ninth Day of August, 1995

*Attest:*

BRUCE LEHMAN

*Attesting Officer*     *Commissioner of Patents and Trademarks*